(12) United States Patent
Goto et al.

(10) Patent No.: US 11,935,306 B2
(45) Date of Patent: Mar. 19, 2024

(54) DATA COLLECTION APPARATUS FOR ESTIMATING EMOTION OF A PERSON WATCHING VEHICLE

(71) Applicant: SUBARU CORPORATION, Tokyo (JP)

(72) Inventors: Ikuo Goto, Tokyo (JP); Terunori Kobayashi, Tokyo (JP); Kotaro Uki, Tokyo (JP); Hideyuki Takao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 563 days.

(21) Appl. No.: 17/150,431

(22) Filed: Jan. 15, 2021

(65) Prior Publication Data

US 2021/0279480 A1 Sep. 9, 2021

(30) Foreign Application Priority Data

Mar. 9, 2020 (JP) .................................. 2020-039519

(51) Int. Cl.
*G06V 40/16* (2022.01)
*G06F 16/245* (2019.01)
*G06V 20/56* (2022.01)

(52) U.S. Cl.
CPC ............ *G06V 20/56* (2022.01); *G06F 16/245* (2019.01); *G06V 40/174* (2022.01)

(58) Field of Classification Search
CPC ........ G06V 20/50; G06V 20/54; G06V 20/56; G06V 20/58; G06V 20/588; G06V 20/59; G06V 20/597
See application file for complete search history.

(56) References Cited

U.S. PATENT DOCUMENTS

2017/0102765 A1* 4/2017 Yoneda .............. G06Q 30/0269
2017/0337438 A1* 11/2017 el Kaliouby, Jr. ... A61B 5/6893
2020/0269865 A1* 8/2020 Yoon ..................... B60W 50/14

FOREIGN PATENT DOCUMENTS

JP 2004-342119 A 12/2004

* cited by examiner

*Primary Examiner* — Siamak Harandi
(74) *Attorney, Agent, or Firm* — Rimon P.C.

(57) ABSTRACT

A data collection apparatus includes a processor and a storage. The processor is configured to: estimate an emotion of a person watching an own vehicle on the basis of an image data of a surrounding environment of the own vehicle; generate emotion data including an estimate of the emotion of the person watching the own vehicle; specify a state of the own vehicle viewed by the person watching the own vehicle; and correlate the emotion data with the specified state of the own vehicle. The storage is configured to be caused by the processor to store the emotion data correlated with the specified state of the own vehicle.

15 Claims, 7 Drawing Sheets

| ACQUIRED DATA (SURROUNDING ENVIRONMENT DATA) | MEANS TO ACQUIRE DATA | REASON |
|---|---|---|
| NUMBER OF LANES<br>TRAVELING LANE OF OWN VEHICLE<br>WIDTH/SHAPE/GRADIENT/STATE OF ROAD<br>OBJECT ON ROAD (e.g., WALL)<br>TRAFFIC LIGHT/ROAD SIGN | IMAGE PROCESSING BASED ON IMAGE DATA AND/OR VEHICLE POSITION DATA + MAP DATA | TO OBTAIN CONTRAST OR COLOR DIFFERENCE BETWEEN OWN VEHICLE AND BACKGROUND, AND DIRECTION OF LIGHT INCIDENT ON OWN VEHICLE |
| CALENDAR/SEASON | TELEMATIC INFORMATION | |
| ARTIFICIAL OBJECT | LEARNING BASED ON IMAGE DATA / IMAGE PROCESSING | TO OBTAIN CONTRAST OR COLOR DIFFERENCE BETWEEN OWN VEHICLE AND BACKGROUND |
| SIZE OF ARTIFICIAL OBJECT | IMAGE PROCESSING BASED ON IMAGE DATA AND/OR VEHICLE POSITION DATA + MAP DATA AND/OR TARGET VISUAL ANGLE | |
| SHAPE/COLOR/OLDNESS/SURFACE TEXTURE OF ARTIFICIAL OBJECT | IMAGE PROCESSING BASED ON IMAGE DATA AND/OR VEHICLE POSITION DATA + MAP DATA | |
| NATURAL OBJECT | LEARNING BASED ON IMAGE DATA / IMAGE PROCESSING | |
| SIZE/SHAPE/COLOR OF NATURAL OBJECT | LEARNING BASED ON IMAGE DATA AND/OR TELEMATIC INFORMATION | |
| WEATHER | IMAGE PROCESSING BASED ON IMAGE DATA | TO ESTIMATE EFFECT OF LIGHT INCIDENT ON OWN VEHICLE |
| LIGHT SOURCE | | |
| INTENSITY OF LIGHT SOURCE | ILLUMINOMETER | |
| POSITION OF LIGHT SOURCE | IMAGE PROCESSING BASED ON IMAGE DATA AND/OR VEHICLE POSITION DATA + MAP DATA | |

FIG. 2

| ACQUIRED DATA (VEHICLE STATE DATA) | MEANS TO ACQUIRE DATA | REASON |
|---|---|---|
| SPEED<br>ACCELERATION RATE (TRIAXIAL)<br>JERK (TRIAXIAL)<br>ANGULAR SPEED (TRIAXIAL)<br>STEERING ANGLE<br>ACCELERATOR POSITION<br>/BRAKE PRESSURE | CAN MESSAGE AND/OR GPS INFORMATION | TO RECOGNIZE MOVING STATE (TRAVELING, STOPPING, TURNING) OF OWN VEHICLE |
| TRAVELING POSITION | GPS INFORMATION | TO RECOGNIZE SCENERY OF AREA IN WHICH OWN VEHICLE IS TRAVELING AND DIRECTION OF INCIDENT LIGHT |
| COLOR OF OWN VEHICLE | PRE-REGISTERED VEHICLE DATA | TO RECOGNIZE CONTRAST OR COLOR DIFFERENCE BETWEEN OWN VEHICLE AND BACKGROUND |
| DATA ON EQUIPMENT | PRE-REGISTERED VEHICLE DATA | TO RECOGNIZE FACTOR IMPACTING IMPRESSION ABOUT DESIGN OF OWN VEHICLE |

FIG. 3

| ACQUIRED DATA (PERSON DATA) | MEANS TO ACQUIRE DATA | REASON |
|---|---|---|
| PERSON | LEARNING BASED ON IMAGE DATA / IMAGE PROCESSING | TO RECOGNIZE PERSON WATCHING OWN VEHICLE |
| DIRECTION OF LINE OF SIGHT / DURATION TIME / FREQUENCY | IMAGE PROCESSING BASED ON IMAGE DATA | |
| TYPE / LEVEL OF EMOTION | IMAGE PROCESSING AND ANALYSIS BASED ON IMAGE DATA | TO RECOGNIZE EMOTION OF PERSON WATCHING OWN VEHICLE |
| POSITION OF PERSON / DISTANCE / RELATIVE SPEED | LEARNING BASED ON IMAGE DATA / IMAGE PROCESSING | TO RECOGNIZE STATE OF PERSON WATCHING OWN VEHICLE (WHETHER PERSON IS NEAR OWN VEHICLE / WHETHER PERSON IS MOVING) |
| ATTRIBUTE OF PERSON | LEARNING BASED ON IMAGE DATA / IMAGE PROCESSING | TO CATEGORIZE ATTRIBUTE (SEX / AGE / NATIONALITY / RESIDENT AREA / INCOME / OCCUPATION / ACADEMIC BACKGROUND / FAMILY CONFIGURATION) |

FIG. 4

DATA COLLECTION APPARATUS FOR ESTIMATING EMOTION OF A PERSON WATCHING VEHICLE

CROSS-REFERENCE TO RELATED APPLICATIONS

The present application claims priority from Japanese Patent Application No. 2020-039519 filed on Mar. 9, 2020, the entire contents of which are hereby incorporated by reference.

BACKGROUND

The technology relates to a data collection apparatus for a vehicle.

In design evaluation of an automobile for product development, functional factors, such as an operation button or an operation switch, are often evaluated on the basis of clear criteria, whereas emotional factors, such as the aesthetic design of the appearance of the automobile, are often evaluated by evaluators in a subjective or emotional way. Thus, ideally, the number of sample evaluators or the sample size should be as large as possible to obtain a number of evaluation results close to the population. However, realistically, a limited number of evaluation results have been collected due to a biased sampling group and costs and time constraints on collecting evaluators.

Japanese Unexamined Patent Application Publication (JP-A) No. 2004-342119 discloses an evaluation method involving measuring biological information to exclude objective evaluation results. For example, the product design evaluation method disclosed in JP-A No. 2004-342119 involves causing an image output device to output an image of design to be evaluated, measuring brain waves of a subject watching the image of design appearing on the image output device, evaluating the design on the basis of the electroencephalographic response, and repeating steps from design examination to design evaluation until proper evaluation results are obtained.

SUMMARY

An aspect of the technology provides a data collection apparatus including a processor and a storage. The processor is configured to: estimate an emotion of a person watching an own vehicle on the basis of an image data of a surrounding environment of the own vehicle; generate emotion data including an estimate of the emotion of the person watching the own vehicle; specify a state of the own vehicle viewed by the person watching the own vehicle; and correlate the emotion data with the specified state of the own vehicle. The storage is configured to be caused by the processor to store the emotion data correlated with the specified state of the own vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 2 is a table illustrating example surrounding environment data acquired by the data collection apparatus according to one example embodiment of the technology.

FIG. 3 is a table illustrating example vehicle state data acquired by the data collection apparatus according to the example embodiment of the technology.

FIG. 4 is a table illustrating example person data acquired by the data collection apparatus according to the example embodiment of the technology.

DETAILED DESCRIPTION

It is considered that the aesthetic appearance of a moving automobile greatly affects the results of design evaluation of the automobile and customer's appetite for buying the automobile. However, currently developed methods of design evaluation of the aesthetic appearance of an automobile generally involve specific evaluators collected in a predetermined place, rather than a large number of unspecified persons. The method disclosed in JP-A No. 2004-342119 fails to disclose a design evaluation method involving a large number of unspecified persons. For example, a currently developed method of design evaluation of an automobile involves just rotating the automobile on a turntable to show a change in light incident on the automobile, which remains a long way from a dynamic evaluation of a moving automobile. Thus, it has been desired to provide a method of design evaluations involving a large number of unspecified persons in the real world.

It is desirable to provide a data collection apparatus that collects data on dynamic design evaluation of the aesthetic appearance of a vehicle from a large number of unspecified persons.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

[1. Example Configuration of Data Collection Apparatus]

Figure 1:
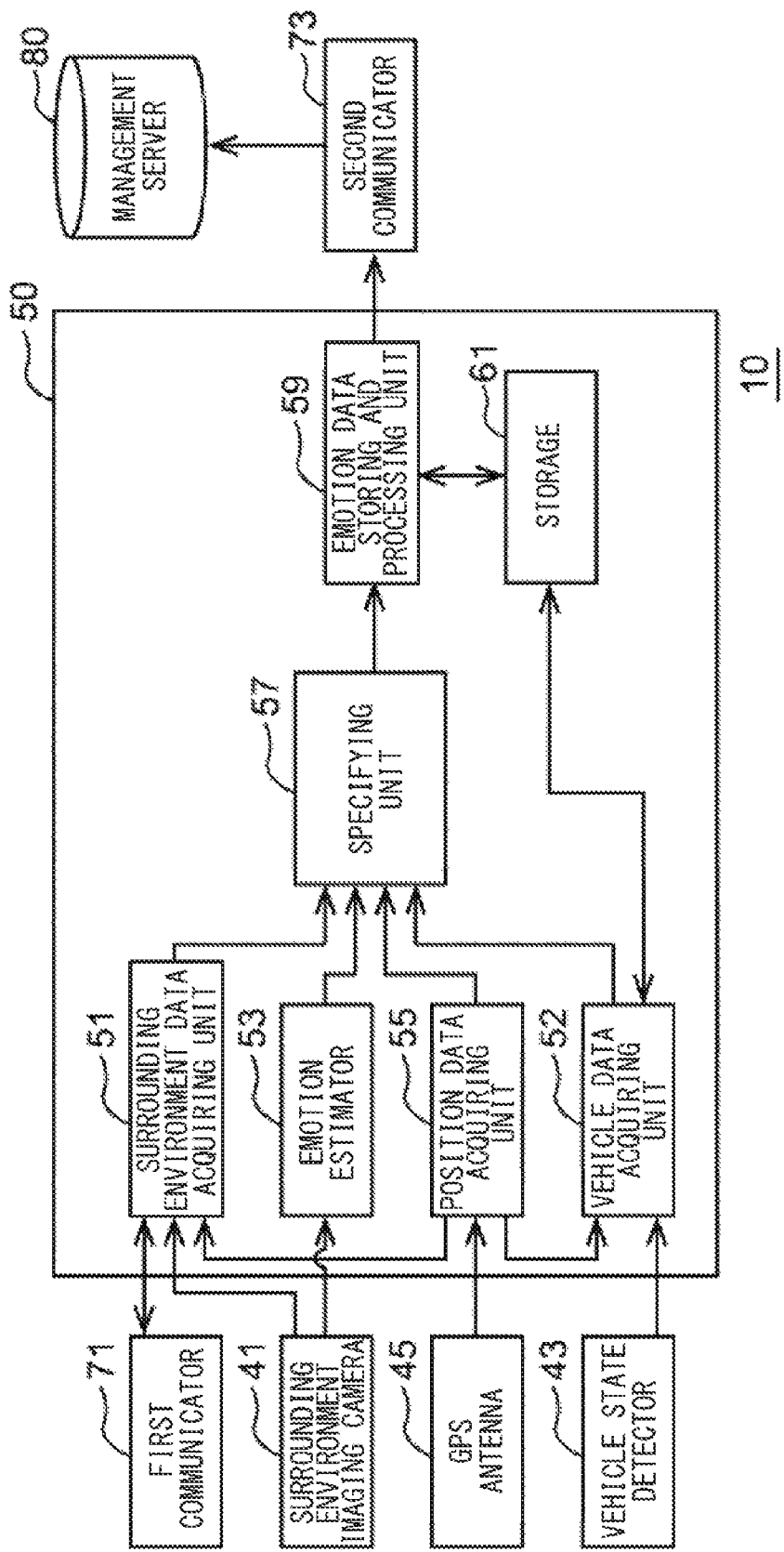
FIG. 1 is a block diagram illustrating an example configuration of a data collection apparatus according to one example embodiment of the technology.

First, an example configuration of a data collection apparatus according to an example embodiment of the technology will now be described. FIG. 1 is a block diagram illustrating an example configuration of a data collection apparatus 10 according to the example embodiment of the technology.

The data collection apparatus 10 may be mounted in a vehicle. The data collection apparatus 10 estimates an emotion of a person watching the vehicle, correlates data on the estimated emotion (hereinafter referred to as emotion data) with data on a vehicle state (hereinafter referred to as vehicle state data), and store the emotion data correlated with the vehicle state data. The data collection apparatus 10 may include a first communicator 71, a second communicator 73, a surrounding environment imaging camera 41, a vehicle state detector 43, a global positioning system (GPS) antenna 45, and an electronic controller 50. The first communicator 71, the second communicator 73, the surrounding environment imaging camera 41, the vehicle state detector 43, and the GPS antenna 45 may be coupled to the electronic controller 50 in a direct manner or via a communication network such as a controller area network (CAN) or a local interconnect network (LIN).

[1-1. Surrounding Environment Imaging Camera]

The surrounding environment imaging camera 41 may capture an image of a surrounding environment of the vehicle. The surrounding environment imaging camera 41 may be mounted in the vehicle as an essential component of the vehicle or an optional component for a design evaluation of the vehicle. The surrounding environment imaging camera 41 may include one or more cameras installed to capture an image of at least one of an environment in front of the vehicle, an environment on either side of the vehicle, or an environment behind the vehicle. In some example embodiment, the surrounding environment imaging camera 41 may be installed so as to capture a 360° image of the surrounding environment of the vehicle to evaluate the design of aesthetic appearance of the own vehicle seen from any direction. The surrounding environment imaging camera 41 may include an imaging device, such as a charge coupled device (CCD) or a complementary metal oxide semiconductor (CMOS). The surrounding environment imaging camera 41 may send the acquired image data to the electronic controller 50. The electronic controller 50 may be configured to receive the image data acquired by the surrounding environment imaging camera 41.

[1-2. Vehicle State Detector]

The vehicle state detector 43 may acquire the vehicle state data. The term "vehicle state" may refer to a driving operation and behavior of the vehicle. The vehicle state detector 43 may acquire data on a behavior, such as a vehicle speed, an acceleration rate, or a yaw rate, of the vehicle. The vehicle state detector 43 may include at least one of an engine revolution sensor, a vehicle speed sensor, an acceleration sensor, or an angular rate sensor, for example. The vehicle state detector 43 may further acquire data on a driving operation, such as an accelerator operation amount, a brake operation amount, or a steering wheel angle, of the vehicle. The vehicle state detector 43 may include at least one of an accelerator position sensor, a brake stroke sensor, or a steering angle sensor, for example. The vehicle state detector 43 may send the acquired data to the electronic controller 50. The electronic controller 50 may be configured to receive the data acquired by the vehicle state detector 43.

[1-3. GPS Antenna]

The GPS antenna 45 may receive satellite signals from satellites of the global positioning system (GPS). The GPS antenna 45 may transmit position data of the vehicle in map data (hereinafter referred to as vehicle position map data) included in the received satellite signal to the electronic controller 50. The electronic controller 50 may be configured to receive the position data from the GPS antenna 45. In place of the GPS antenna 45, another receiving antenna may be provided to receive satellite signals from another satellite system that specifies the position of the vehicle.

[1-4. First Communicator and Second Communicator]

The first communicator 71 may be an interface used to communicate with a device outside the vehicle via a means of communication, such as a vehicle-to-vehicle communication, a road-to-vehicle communication, and a mobile communication network. The first communicator 71 may include one or more interfaces in conformance with the specifications of the respective means of communication. Note that the first communicator 71 may communicate with an external device via a means of communication other than the means described above.

The second communicator 73 may be an interface used to communicate with an external management server 80 via a means of communication such as a mobile communication network. The second communicator 73 may include an interface in conformance with the specifications of the mobile communication network. Note that the second communicator 73 may communicate with the external management server 80 via a means of communication other than the mobile communication network. Alternatively, the first communicator 71 may also serve as the second communicator 73.

[1-5. Electronic Controller]

The electronic controller 50 may include an arithmetic processing unit such as a central processing unit (CPU) or a micro-processing unit (MPU), an image processing unit such as a graphic processing unit (GPU), and a memory such as a random access memory (RAM) or a read only memory (ROM). The arithmetic processing unit may execute programs stored in the memory to conduct various calculation processes. Note that a portion or the entirety of the electronic controller 50 may be updatable software such as firmware, or a program module to be executed in response to a command from the CPU, for example.

In the example embodiment, the electronic controller 50 may include a surrounding environment data acquiring unit 51, a vehicle data acquiring unit 52, an emotion estimator 53, a position data acquiring unit 55, a specifying unit 57, an emotion data storing and processing unit 59, and a storage 61. Among these components, the surrounding environment data acquiring unit 51, the vehicle data acquiring unit 52, the emotion estimator 53, the position data acquiring unit 55, the specifying unit 57, and the emotion data storing and processing unit 59 may be implemented by programs executed by the arithmetic processing unit or the image processing unit.

[1-5-1. Storage]

The storage 61 may include a memory such as a RAM or a ROM. In addition to or in place of the memory, the storage 61 may include a storage medium, such as a hard disk drive (HDD), a compact disc (CD), a digital versatile disc (DVD), a solid state drive (SSD), a universal serial bus (USB) flash drive, or another storage device. The storage 61 may store software programs to be executed by the arithmetic processing unit or the image processing unit, various parameters to be used for calculation processing, data acquired, and calculation results, for example. The storage 61 may further store pre-registered vehicle data regarding the color and exterior equipment of the vehicle and the emotion data collected.

[1-5-2. Position Data Acquiring Unit]

On the basis of the data received from the GPS antenna 45, the position data acquiring unit 55 may acquire the vehicle position map data.

[1-5-3. Surrounding Environment Data Acquiring Unit]

On the basis of the image data received from the surrounding environment imaging camera 41, the surrounding environment data acquiring unit 51 may acquire data on the surrounding environment (hereinafter referred to as surrounding environment data) of the vehicle. The surrounding environment data acquiring unit 51 may acquire data on other vehicles, bicycles, buildings, natural objects, roads, and weather around the vehicle using an object detection method that involves processing of the image data received from the surrounding environment imaging camera 41. For example, the surrounding environment data acquiring unit 51 may acquire data on the size, shape, color, oldness, or surface texture of a building, and the contrast between the building and the vehicle on the basis of the image data. The surrounding environment data acquiring unit 51 may further acquire data on the size, shape, or color of a natural object, such as a tree, a river, or a mountain, on the basis of the image data, for example. The surrounding environment data acquiring unit 51 may further acquire data on the shape, type (an ordinary road or a high-speed way), width, color, and surface condition of the road on the basis of the image data, for example. The surrounding environment data acquiring unit 51 may further acquire data on the size and type of another vehicle, a position relation between the other vehicle and the own vehicle, and a speed of the other vehicle relative to a speed of the own vehicle, on the basis of the image data, for example. The surrounding environment data acquiring unit 51 may further include data on the amount of sunlight, the amount of rain, and the view field distance, on the basis of the image data, for example.

The surrounding environment data acquiring unit 51 may acquire the data transmitted from a device outside the vehicle via a means of communication such as a vehicle-to-vehicle communication or a mobile communication network to specify a part of the surrounding environment data of the vehicle. Alternatively, the surrounding environment data acquiring unit 51 may specify a position of the own vehicle on the basis of the vehicle position map data received from the position data acquiring unit 55 to specify a part of the surrounding environment data of the vehicle.

With reference to FIG. 2, examples of the surrounding environment data acquired by the surrounding environment data acquiring unit 51, means for acquiring the surrounding environment data, and a reason why the surrounding environment data is acquired will now be described. The surrounding environment data acquiring unit 51 may acquire some or all pieces of the surrounding environment data using the means illustrated in FIG. 2. For example, on the basis of at least one of the data acquired by processing the image data received from the surrounding environment imaging camera 41 or the vehicle position map data, the surrounding environment data acquiring unit 51 may acquire data on at least one of the number of lanes of the road on which the vehicle is traveling, the lane on which the vehicle is traveling, the width of the road, the shape of the road, the gradient of the road, the condition of the road, an object on the road, a traffic light, or a traffic sign on the road. The surrounding environment data acquiring unit 51 may further acquire data on calendar or season on the basis of data received from an external telematic system via the first communicator 71. The acquired data may be used to estimate the contrast or color difference between the own vehicle and the background color, and the direction of light incident on the own vehicle.

The surrounding environment data acquiring unit 51 may further acquire data on an artificial object present around the vehicle on the basis of the data acquired by processing the image data received from the surrounding environment imaging camera 41 or the data acquired by performing a process of learning the object recognition based on the image data. The surrounding environment data acquiring unit 51 may further acquire data on the size of the artificial object present around the vehicle on the basis of at least one of the data acquired by processing the image data received from the surrounding environment imaging camera 41, the vehicle position map data, or data on the visual angle of a target object. The surrounding environment data acquiring unit 51 may further acquire data on at least one of the shape, color, oldness, and surface texture of the artificial object present around the vehicle on the basis of at least one of the data acquired by processing the image data received from the surrounding environment imaging camera 41 or the vehicle position map data. The surrounding environment data acquiring unit 51 may further acquire data on a natural object present around the vehicle and data on at least one of the size, shape, or color of the natural object on the basis of the data acquired by processing the image data received from the surrounding environment imaging camera 41 or the data acquired by performing the process of learning the object recognition based on the image data. The acquired data may be used to estimate the contrast or color difference between the own vehicle and the background color.

The surrounding environment data acquiring unit 51 may further acquire data on the weather of an area in which the vehicle is traveling on the basis of at least one of the data acquired by processing the image data received from the surrounding environment imaging camera 41 or the data acquired from the external telematic system via the first communicator 71. The surrounding environment data acquiring unit 51 may further acquire data on a light source emitting light to the own vehicle on the basis of the data acquired by processing the image data received from the surrounding environment imaging camera 41. The surrounding environment data acquiring unit 51 may further acquire data on the intensity of light from the light source on the basis of an output signal of an illuminometer mounted in the vehicle. The surrounding environment data acquiring unit 51 may further acquire data on the position of the light source on the basis of at least one of the data acquired by processing the image data received from the surrounding environment imaging camera 41 or the vehicle position map data. The light source may include, for example, the sun and an illuminator. The acquired data may be used to estimate an effect of light incident on the vehicle.

On the basis of the surrounding environment data of the vehicle collected, the surrounding environment data acquiring unit 51 may recognize the contrast or color difference between the own vehicle and the background color, and the direction of light incident on the own vehicle viewed by a person. This allows analysis of an emotion of the person that varies depending on the conditions of the environment around the own vehicle. Note that the acquired data illustrated in FIG. 2 are mere examples and other pieces of data may be acquired.

[1-5-4. Vehicle Data Acquiring Unit]

On the basis of the data received from the vehicle state detector 43 and the data stored in the storage 61, the vehicle data acquiring unit 52 may acquire data on the vehicle. The data on the vehicle acquired may include data on the driving state and behavior of the vehicle, data on the color of the vehicle, and data on the exterior equipment of the vehicle. Examples of the exterior equipment may include an aero part, such as a spoiler, a rear wing, or a sidestep. The data on the driving state and behavior of the vehicle may be acquired on the basis of an output signal of the vehicle state detector 43 received via a means of communication, such as a CAN or LIN. The data on the color of the vehicle and the data on the exterior equipment of the vehicle may be stored in the storage 61 in advance.

With reference to FIG. 3, examples of vehicle state data acquired by the vehicle data acquiring unit 52, means for acquiring the vehicle state data, and a reason why the vehicle state data is acquired will now be described. The vehicle data acquiring unit 52 may acquire some or all pieces of the vehicle state data using the means illustrated in FIG. 3. For example, on the basis of sensor data included in a CAN message and the vehicle position map data acquired by the position data acquiring unit 55, the vehicle data acquiring unit 52 may acquire data on the speed, acceleration rate, jerk, angular speed, steering angle, accelerator position, and brake pressure of the own vehicle. The acquired data may be used to estimate a moving state, such as traveling, stopping, or turning of the own vehicle.

The vehicle data acquiring unit 52 may acquire data on a traveling position of the own vehicle on the basis of the vehicle position map data acquired by the position data acquiring unit 55. The acquired data may be used to estimate the scenery of an area in which the own vehicle is traveling, and the direction of incident light. The vehicle data acquiring unit 52 may acquire the data on the color of the own vehicle and the data on the exterior equipment of the own vehicle on the basis of the pre-registered vehicle data stored in the storage 61. The data on the color of the own vehicle may be used to estimate the contrast or color difference between the own vehicle and the background color. The data on the exterior equipment of the own vehicle may be used to estimate a possible factor affecting the impression about the design of the own vehicle.

The vehicle data acquiring unit 52 may recognize the driving state and the background of the own vehicle viewed by a person, a light condition, and a factor affecting the impression about the design of the own vehicle on the basis of the collected vehicle state data. This allows analysis of an emotion of the person watching the aesthetic appearance of the own vehicle or the equipment of the own vehicle. Note that the acquired data illustrated in FIG. 3 are mere examples and other pieces of data may be acquired.

[1-5-5. Emotion Estimator]

The emotion estimator 53 may estimate an emotion of the person watching the own vehicle on the basis of the image data received from the surrounding environment imaging camera 41. For example, the emotion estimator 53 may specify the person watching the own vehicle by extracting a facial image of the person and detecting the line of sight of the person on the basis of the image data using an objection detection method. Examples of the person to be specified may include a pedestrian, a person stopped walking, a person riding on a bicycle, and an occupant in another vehicle. When specifying the person watching the own vehicle, the emotion estimator 53 may analyze facial expression data of the person through, for example, a facial expression analysis based on FACS theory to estimate the emotion of the person. The estimated emotion may be defined in several levels for each of the emotions including delight, anger, sorrow, and pleasure, for example. Note that the estimation of the person may be estimated through another method.

Alternatively, the emotion estimator 53 may calculate the degree of interest in the own vehicle of the person watching the own vehicle, and estimate the emotion of the person in a case where the degree of interest in the own vehicle is greater than a predetermined threshold. This helps to prevent unnecessary collection of the emotion data of a person directing his/her line of sight to the own vehicle but not interested in the own vehicle. The degree of interest in the own vehicle may be determined as the rate of duration time in which the line of sight of the person is directed to the own vehicle relative to a predetermined time, for example. Alternatively, the emotion estimator 53 may determine the degree of interest in the own vehicle on the basis of a change in the emotion of the person directing his/her line of sight to the own vehicle per unit time. Still alternatively, the emotion estimator 53 may determine the degree of interest in the own vehicle on the basis of a change in the movement of the person after directing his/her line of sight to the own vehicle. For example, in a case where a person running with his/her line of sight directed to the own vehicle stops running and fixes his/her eyes on the own vehicle, the emotion estimator 53 may estimate that the person has a high degree of interest in the own vehicle.

With reference to FIG. 4, examples of person data acquired by the emotion estimator 53, means for acquiring the person data, and a reason why the person data is acquired will now be described. The emotion estimator 53 may acquire some or all pieces of the person data using the means illustrated in FIG. 4. For example, on the basis of the data acquired by processing the image data received from the surrounding environment imaging camera 41 or the data acquired by performing the process of learning the object recognition based on the image data, the emotion estimator 53 may detect a person present around the own vehicle. The emotion estimator 53 may further acquire data on at least one of the direction of the line of sight of the person detected, the duration time in which the person directs his/her line of sight to the own vehicle, or the frequency of directing his/her line of sight to the own vehicle, on the basis of the data acquired by processing the image data received from the surrounding environment imaging camera 41. The acquired data may be used to recognize the person fixing his/her eyes on the own vehicle.

The emotion estimator 53 may acquire at least one of data on the type of the emotion of the person fixing his/her eyes on the own vehicle or the data on the emotion level of the person fixing his/her eyes on the own vehicle on the basis of the data acquired by processing the image data received from the surrounding environment imaging camera 41 and the data acquired by analyzing the image data received from the surrounding environment imaging camera 41. The acquired data may be used to recognize the emotion of the person fixing his/her eyes on the own vehicle. The emotion estimator 53 may further acquire data on at least one of the position of the person present around the own vehicle, the distance between the person and the own vehicle, or the relative speed between the person and the own vehicle, on the basis of the data acquired by processing the image data received from the surrounding environment imaging camera 41 or the data acquired by performing the process of learning the object recognition based on the image data. The acquired data may be used to recognize the state of the person fixing his/her eyes on the own vehicle. That is, it may be determined whether the person fixing his/her eyes on the own vehicle is present near the own vehicle or whether the person is moving.

The emotion estimator 53 may further acquire data on the attribute of the person fixing his/her eyes on the own vehicle on the basis of the data acquired by processing the image data received from the surrounding environment imaging camera 41 and the data acquired by analyzing the image data received from the surrounding environment imaging camera 41. The data on the attribute of the person may include data on at least one of the sex, age, nationality, resident area, income, occupation, academic background, or family configuration. For example, on the basis of the data acquired by processing the image data received from the surrounding environment imaging camera 41 and the data acquired by analyzing the image data received from the surrounding environment imaging camera 41, the emotion estimator 53 may specify the person through, for example, a feature quantity analysis, and acquire the data on the attribute of the person referring to the attribute data accumulated in the external management server 80. The acquired data may be used to categorize the attribute of the person fixing his/her eyes on the own vehicle and analyze a tendency of what kind of person has what kind of emotion to the own vehicle.

The emotion estimator 53 may recognize the emotion, state, and attribute of the person fixing his/her eyes on the own vehicle on the basis of the collected person data. This allows analysis of design evaluations of the vehicle and vehicle marketing information. Note that the acquired data illustrated in FIG. 4 are mere examples and other pieces of data may be acquired.

[1-5-6. Specifying Unit]

The specifying unit 57 may specify the state of the own vehicle viewed by the person watching the own vehicle on the basis of the data acquired by the surrounding environment data acquiring unit 51, the vehicle data acquiring unit 52, the emotion estimator 53, and the position data acquiring unit 55. For example, the specifying unit 57 may specify the data on surrounding environment of the own vehicle viewed by the person watching the own vehicle. The surrounding environment data may include data on at least one of buildings, natural objects, roads, other vehicles, or weather. The specifying unit 57 may further specify a portion of the own vehicle that the person is watching. The specifying unit 57 may further specify the attribute of the person watching the own vehicle. The attribute of the person may include data on at least one of the sex or age of the person. In a case where the person watching the own vehicle is an occupant in another vehicle, the attribute of the person may include data on the speed of the occupant (i.e., the speed of the other vehicle) relative to the own vehicle.

[1-5-7. Emotion Data Storing and Processing Unit]

The emotion data storing and processing unit 59 may perform a process of correlating the emotion data of the person watching the own vehicle with the data on the state of the own vehicle specified by the specifying unit 57 and storing the resultant data in the storage 61. Through the process, the data on the attribute of the person watching the own vehicle, the visual angle of the person, the background of the own vehicle viewed by the person, a portion of the own vehicle that the person is watching, and the emotion of the person elicited by the design of the own vehicle may be accumulated in the storage 61. This allows analysis of the attribute of a person interested in the own vehicle or the attribute of a person not interested in the own vehicle, the visual angle of the person interested in the own vehicle, and the background of the own vehicle viewed by the person interested in the own vehicle.

When accumulating the emotion data in the storage 61, the emotion data storing and processing unit 59 may correlate the emotion data with data on at least one of the season, calendar, or time. This allows analysis of the emotion of the person elicited by the design of the vehicle in a surrounding environment that changes depending on the season, calendar, and time.

In some example embodiments, the emotion data storing and processing unit 59 may correlate the emotion data of the person watching the own vehicle timewise with the data on the state of the vehicle viewed by the person, and store the resultant data on the storage 61 at each processing cycle depending on the throughput of the arithmetic processing unit. Through the processes, time-series emotion data of the person watching the own vehicle may be accumulated in the storage 61. This enables collection of data on an emotional change of the person in association with a dynamic change in the vehicle state, and data on the emotion elicited by the dynamic change in the vehicle state. The emotion data storing and processing unit 59 may transmit the data accumulated in the storage 61 via the second communicator 73 to a management server. The management server may be the external management server 80 that stores the data on the attribute of the person or a different server.

[2. Example Operation of Data Collection Apparatus]

Figure 5:
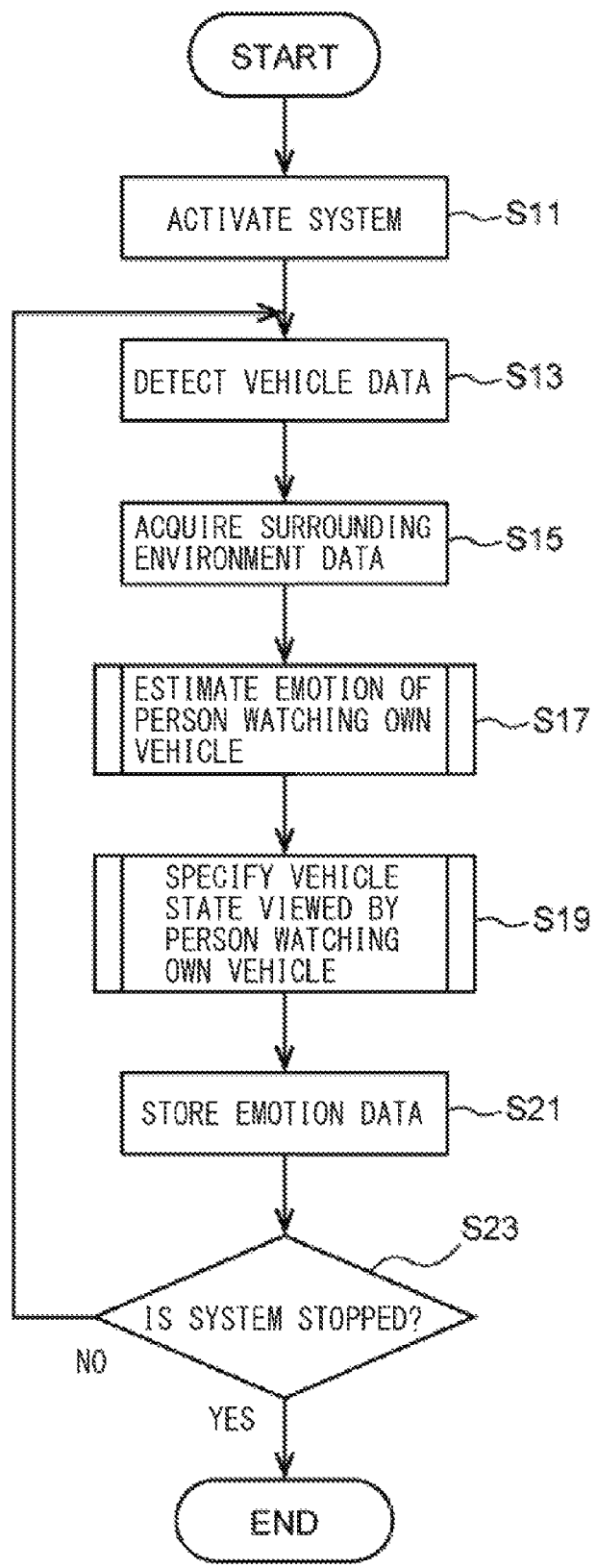
FIG. 5 is a flowchart of an example operation of the data collection apparatus according to the example embodiment of the technology.

One example configuration of the data collection apparatus 10 according to the example embodiment has been described above. Next, an example operation of the data collection apparatus 10 according to an example embodiment will now be described with reference to the flowcharts illustrated in FIGS. 5 to 7. Hereinafter, the description of some of the contents described above may be omitted.

First, the electronic controller 50 may detect activation of the data collection apparatus 10 (Step S11). Thereafter, the vehicle data acquiring unit 52 may acquire the vehicle state data illustrated in FIG. 3 on the basis of the vehicle position map data specified by the position data acquiring unit 55, the output signal of the vehicle state detector 43, and the pre-registered vehicle data stored in the storage 61 (Step S13). Thereafter, the surrounding environment data acquiring unit 51 may acquire the surrounding environment data illustrated in FIG. 2 on the basis of the vehicle position map data specified by the position data acquiring unit 55 and the image data transmitted from the surrounding environment imaging camera 41 (Step S15). Thereafter, the emotion estimator 53 may acquire the person data illustrated in FIG. 4 on the basis of the image data transmitted from the surrounding environment imaging camera 41, and estimate an emotion of the person watching the own vehicle (Step S17).

Figure 6:
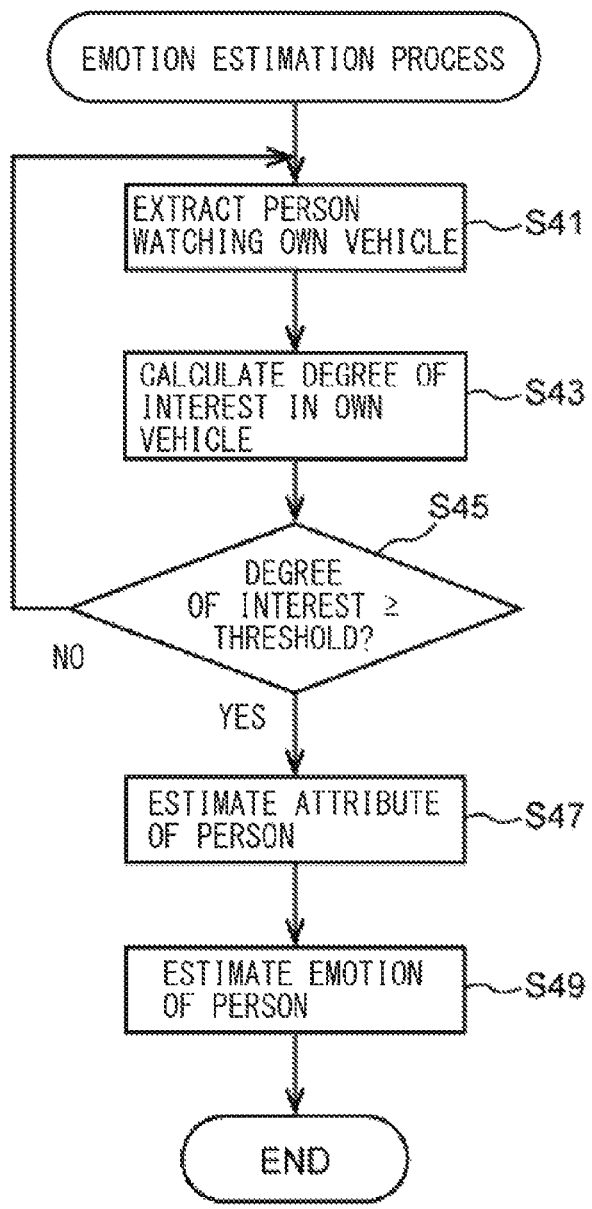
FIG. 6 is a flowchart of an emotion estimation process executed by the data collection apparatus according to the example embodiment of the technology.

FIG. 6 is a flowchart of a process of estimating the emotion of the person watching the own vehicle. First, the emotion estimator 53 may extract the person watching the own vehicle on the basis of the image data transmitted from the surrounding environment imaging camera 41 through an object detection method (Step S41). For example, the emotion estimator 53 may detect persons present around the own vehicle and extract a person directing his/her line of sight to the own vehicle from the detected persons on the basis of the direction of the line of sight of the person. Thereafter, the emotion estimator 53 may calculate the degree of interest in the own vehicle of the person (Step S43). For example, the degree of the interest may be the rate of duration time in which the line of sight of the person is directed to the own vehicle relative to a predetermined time. Alternatively, the emotion estimator 53 may determine the degree of interest in the own vehicle on the basis of an emotional change per unit duration time in which the line of sight is directed to the own vehicle. Still alternatively, the emotion estimator 53 may determine the degree of interest in the own vehicle on the basis of a change in the movement of the person after directing his/her line of sight to the own vehicle.

Thereafter, the emotion estimator 53 may determine whether the calculated degree of interest is equal to or greater than a predetermined threshold (Step S45). In a case where the calculated degree of interest is less than the predetermined threshold (Step S45: NO), the emotion estimator 53 may cause the process to return to Step S41 in which a person watching the own vehicle is extracted again. In contrast, the calculated degree of interest is equal to or greater than the predetermined threshold (Step S45: YES), the emotion estimator 53 may estimate the attribute, such as sex, age, and nationality, of the person through a method of extracting a feature quantity from the image data received from the surrounding environment imaging camera 41 (Step S47). Alternatively, the emotion estimator 53 may retrieve the data on the attribute of the person from the data stored in the external management server 80 after specifying the person. Thereafter, the emotion estimator 53 may estimate an emotion of the person (Step S49). For example, the emotion estimator 53 may analyze facial expression data of the person by conducting a facial expression analysis based on FACS theory on a facial region of the extracted person to estimate the emotion of the person. The estimated emotion may be defined in several levels for each of the emotions including delight, anger, sorrow, and pleasure, for example.

Figure 7:
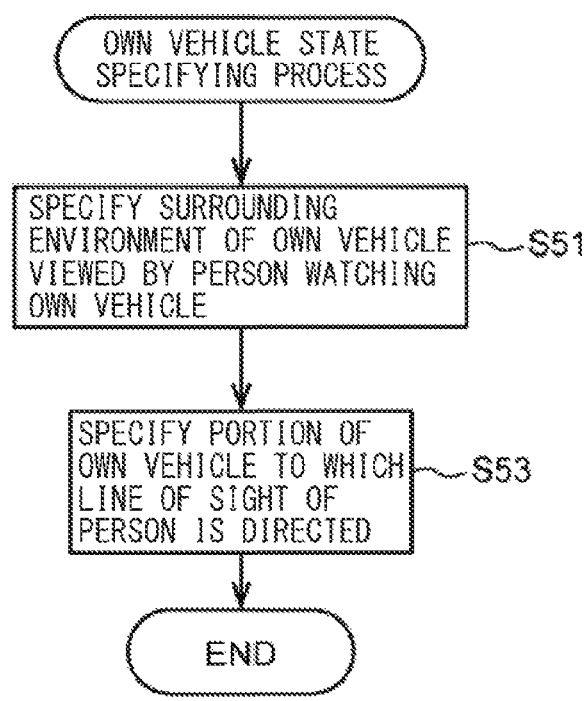
FIG. 7 is a flowchart of an own-vehicle state specifying process executed by the data collection apparatus according to the example embodiment of the technology.

Returning to FIG. 5, after the emotion estimator 53 estimates the emotion of the person watching the own vehicle (Step S17), the specifying unit 57 may specify the state of the own vehicle viewed by the person watching the own vehicle (Step S19). For example, as illustrated in FIG. 7, the specifying unit 57 may specify the surrounding environment (i.e., the background) viewed by the person watching the own vehicle by combining the data acquired by the surrounding environment data acquiring unit 51, the data acquired by the emotion estimator 53, and the data acquired by the position data acquiring unit 55 (Step S51). Thereafter, the specifying unit 57 may specify a portion of the own vehicle that the person is watching (Step S53).

After the specifying unit 57 specifies the state of the own vehicle viewed by the person watching the own vehicle (Step S19), the emotion data storing and processing unit 59 may correlate the emotion data of the person with the data on vehicle state specified, and store the resultant data in the storage 61 (Step S21). In this example embodiment, the specifying unit 57 may further correlate the emotion data of the person with the data on the attribute of the person and the data on the season or calendar in addition to the data on vehicle state specified, and store the resultant data in the storage 61. Alternatively, the emotion data storing and processing unit 59 may transmit the data stored in the storage 61 to the external management server 80 to store the data in the external management server 80.

Thereafter, it may be determined whether the data collection apparatus 10 is stopped (Step S23). If the data collection apparatus 10 is not stopped (Step S23: NO), the electronic controller 50 may repeat a series of Steps from S13 to S21 at each processing cycle depending on the throughput of the arithmetic processing unit to accumulate time-series emotion data of the person. In contrast, if the data collection apparatus 10 is stopped (Step S23: YES), the electronic controller 50 may end the series of processing operations.

According to the data collection apparatus 10 of at least one foregoing example embodiment of the technology described above, the person watching the own vehicle is specified on the basis of the image data of the surrounding environment of the own vehicle, the emotion of the person is estimated, the emotion data of the person is correlated with the data on the state of the own vehicle viewed by the person, and the resultant data is stored. Therefore, it is possible to collect, from unspecified persons, the data on the emotion of a person watching the own vehicle in a certain situation. That is, it is possible to collect data on dynamic design evaluations of the aesthetic appearance of the own vehicle from a large number of unspecified persons.

Further, the emotion data collected by the data collection apparatus 10 may be stored in correlation with the data on the contrast or color difference between the own vehicle and the surrounding environment viewed by a person, the condition of light incident on the own vehicle, the visual angle of the person watching the own vehicle, the relative speed, and a portion of the own vehicle that the person is watching, for example. Additionally, the emotion data collected by the data collection apparatus 10 may be stored in correlation with the data on the driving state or behavior of the vehicle. This allows analysis of an effective way to show the vehicle, and analysis of design evaluation of the vehicle per each portion of the vehicle. Optionally, the emotion data collected by the data collection apparatus 10 may be stored together with the data on the attribute of the person. This allows analysis of what kind of vehicle design is liked or disliked by what kind of person. The accumulated data may be used for marketing strategies in selling vehicles.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The invention claimed is:

1. A data collection apparatus comprising a processor configured to:
   detect a person who is watching an own vehicle from image data of a surrounding environment of the own vehicle;
   calculate a degree of interest the person has in the own vehicle;
   determine that the degree of interest is equal to or greater than a predetermined threshold;
   in response to determining that the degree of interest is equal to or greater than the predetermined threshold, estimate, using Facial Action Coding System, an emotion of the person based on the image data;
   generate emotion data including an estimate of the emotion of the person watching the own vehicle,
   specify a state of the own vehicle viewed by the person, and
   correlate the emotion data with the specified state of the own vehicle; and
   in response correlating the emotion data with the specified state of the own vehicle, control a storage to store the emotion data correlated with the specified state of the own vehicle.

2. The data collection apparatus according to claim 1, wherein the processor is configured to:
   specify data on the surrounding environment of the own vehicle viewed by the person, and correlate the emotion data with the data on the surrounding environment; and
cause the storage to store the emotion data correlated with the data on the surrounding environment.

3. The data collection apparatus according to claim 2, wherein the processor is configured to specify data on at least one of a building, a natural object, a road, another vehicle, or weather as the data on the surrounding environment of the own vehicle viewed by the person watching the own vehicle.

4. The data collection apparatus according to claim 2, wherein the processor is further configured to:
specify a portion of the own vehicle that the person is watching on a basis of the image data;
correlate the emotion data with data on the portion of the own vehicle that the person is watching; and
cause the storage to store the emotion data correlated with the data on the portion of the own vehicle that the person is watching.

5. The data collection apparatus according to claim 2, wherein the processor is further configured to:
specify an attribute of the person watching the own vehicle on a basis of the image data;
correlate the emotion data with data on the attribute of the person; and
cause the storage to store the emotion data correlated with the data on the attribute of the person.

6. The data collection apparatus according to claim 5, wherein, in a case where the person watching the own vehicle is an occupant in another vehicle, the data on the attribute of the person includes data on a speed of the occupant relative to the own vehicle.

7. The data collection apparatus according to claim 2, wherein the processor is further configured to:
correlate the emotion data with data on at least one of season, calendar, time, or a position on map data; and
cause the storage to store the emotion data correlated with the data on at least one of the season, the calendar, the time, or the position on map data.

8. The data collection apparatus according to claim 2, wherein the processor is configured to cause the storage to store the emotion data of the person as time-series data.

9. The data collection apparatus according to claim 2, wherein the degree of interest in the own vehicle comprises a rate of duration time in which a line of sight of the person is directed to the own vehicle relative to a predetermined time.

10. The data collection apparatus according to claim 1, wherein the processor is further configured to:
specify a portion of the own vehicle that the person is watching on a basis of the image data;
correlate the emotion data with data on the portion of the own vehicle that the person is watching; and
cause the storage to store the emotion data correlated with the data on the portion of the own vehicle that the person is watching.

11. The data collection apparatus according to claim 1, wherein the processor is further configured to:
specify an attribute of the person watching the own vehicle on a basis of the image data;
correlate the emotion data with data on the attribute of the person; and
cause the storage to store the emotion data correlated with the data on the attribute of the person.

12. The data collection apparatus according to claim 11, wherein, in a case where the person watching the own vehicle is an occupant in another vehicle, the data on the attribute of the person includes data on a speed of the occupant relative to the own vehicle.

13. The data collection apparatus according to claim 1, wherein the processor is further configured to:
correlate the emotion data with data on at least one of season, calendar, time, or a position on map data; and
cause the storage to store the emotion data correlated with the data on at least one of the season, the calendar, the time, or the position on map data.

14. The data collection apparatus according to claim 1, wherein the processor is configured to cause the storage to store the emotion data of the person as time-series data.

15. The data collection apparatus according to claim 1, wherein the degree of interest in the own vehicle comprises a rate of duration time in which a line of sight of the person is directed to the own vehicle relative to a predetermined time.

* * * * *